United States Patent [19]

Fachini

[11] Patent Number: 4,833,185
[45] Date of Patent: May 23, 1989

[54] SLUDGE OBTAINED WHEN PROCESSING WASTE LUBRICATING OIL, AND A METHOD FOR UTILIZING THE SLUDGE

[76] Inventor: Marco Fachini, Via Paisiello 28 I, 20131 Milan, Italy

[21] Appl. No.: 169,942

[22] Filed: Mar. 18, 1988

Related U.S. Application Data

[63] Continuation-in-part of Ser. No. 869,210, May 30, 1986, abandoned.

[30] Foreign Application Priority Data

Jun. 4, 1985 [IT] Italy ............................... 21053 A/85
May 28, 1986 [CA] Canada ................................. 510241
May 30, 1986 [JP] Japan ............................... 61-130456
Jun. 3, 1986 [EP] European Pat. Off. ........ 86107331.5
Dec. 4, 1986 [AR] Argentina ............................. 306065
Dec. 4, 1986 [BR] Brazil .................................. 8605892

[51] Int. Cl.$^4$ ..................... C08L 95/00; C08L 23/16; C08L 23/12; C08K 3/00
[52] U.S. Cl. ....................................... 524/68; 524/59; 524/62; 524/70; 524/71; 524/515; 524/518
[58] Field of Search ....................... 524/59, 62, 68, 70, 524/71, 515, 518

[56] References Cited

U.S. PATENT DOCUMENTS

| 3,873,483 | 3/1975 | Gelsner et al. | 524/70 |
| 3,919,148 | 11/1975 | Winters et al. | 524/70 |
| 3,960,793 | 6/1976 | Bosniak | 524/70 |
| 4,105,612 | 8/1978 | Cushman et al. | 524/70 |
| 4,129,542 | 12/1978 | Matheson et al. | 524/70 |
| 4,177,079 | 12/1979 | Essenscheid | 106/274 |

Primary Examiner—Allan M. Lieberman
Attorney, Agent, or Firm—Michael J. Striker

[57] ABSTRACT

This invention concerns a method whereby the sludge obtained when reclaiming waste lubricating oils by treating with acids or solvents can be processed by the addition of elastomers and hardeners to obtain a compound which—when used in conjunction with bituminous conglomerates and mixtures—gives these conglomerates or mixtures superior mechanical characteristics and high strength at high and low temperatures.

15 Claims, No Drawings

SLUDGE OBTAINED WHEN PROCESSING WASTE LUBRICATING OIL, AND A METHOD FOR UTILIZING THE SLUDGE

This application is a continuation-in-part application of application Ser. No. 869,210, filed May 30, 1986, now abandoned.

DESCRIPTION

Waste lubricating oils contain asphaltum-type impurities and cracked-oil residues that have to be removed when reclaiming the oils for reuse.

During this reclaiming process, a considerable amount of sludge is produced which is normally discarded. Finding a way to make commercial use of this sludge, and at the same time, reap benefits from the point of view of the protection of the environment, has represented a very interesting problem. Both today as in the past, great amounts of this sludge accumulate at waste-oil reclamation plants and in other more-or-less makeshift storage areas, giving off offensive odors, threatening to pollute water sources and otherwise adversely affecting the environment and nearby communities.

Selective solvents, such as propane, have been recently used in the waste-oil reclaiming process.

By means of this invention, the sludge refuse of waste-oil reclaiming processes can be turned into a useful product which, because of the absence of a high percentage of inorganic matter, is particularly interesting. This is best accomplished by starting out with the aforementioned type of sludge obtained when solvents are used in the waste-oil reclaiming process. This type of sludge is doughy and contains asphaltum substances and cracked-oil carbonaceous fractions, as well as lubricating-oil fractions, polymer additive compounds and metallic fractions. The very small amount of inorganic material contained in the sludge has about an 18–25% ash content and a P & A softening point of about 104°–105° C.

It was discovered that this type of sludge is compatible with elastomers and hardeners and that at the appropriate temperature they can be easily mixed together to form a high-quality product for use as an additive for bitumens. The S.B.S.-type elasticizer can be used, for example, but E.P.D.M. copolymers are preferred because of their resistance to atmospheric agents, low and high temperatures, and light. Isotactic polypropylene was selected as the hardener because of its low cost, excellent compatibility and high efficiency. The most optimum formula for preparing a specific binding compound for bituminous conglomerates used in surface pavings in general, including road surfaces, is given below. This "optimal compound" whose very special characteristics as a binder, also in other applications, are described further on, is obtained by hot mixing the sludge "as is" with the other components, in the following proportions:

Sludge "as is": 44–66%
Copolymer terpolymer ethylene propylene EPDM: 28–17%
Isotactic polypropylene: 25–17%.

Instead of the EPDM product, EPM (saturated copolymer of ethylene and propylene) may be used, with the same proportions.

The mixture is mechanically mixed (at ca.200–250 rpm) and heated to 180°–190° C. Powdered ethylene/propylene copolymer (600–800 $\mu$)—EPM or EPDM—is first added and stirred until the mixture is homogeneous. Then powdered isotactic polypropylene (600–800 $\mu$) is added and stirred in until the compound is homogeneous.

The resulting produce is quite doughy, has good elasticity and a very high P & A softening point (183°–185° C.).

The most important applications of this "optimal compound" are as follows:

(A) Road Surfacing

The best method for this application, since the compound is in the solid state and considering the particular operational procedures involved, is to first mix 20, 25, 30 or 40% of the "optimal compound" (according to the particular job requirement) with distilled bitumen of the type 180–200 and then prepare small "loaves" of this mixture. Prepared in this manner the ready-to-use "loaves" can be mixed with (and melted by) the hot aggregate (160°–180° C.), such as sand, stone and various fillers, which is fed into the conglomerate mixing unit. With a proportion of 6% binder and 94% inert material, the conglomerate will contain the desired solid amount of the aforesaid "optimal compound".

The preferred amount of "optimal compound" to add to the distilled bitumen (of the type 180–200) when preparing the aforesaid "loaves" is 25%. The addition of "loaves" having this composition to the conglomerate will provide a resistance to temperatures ranging from −25° C. to +150° C.

(B) Waterproofing of Cardboard, Felt, etc.

It was observed that the plasticizers, elastomers and hardeners used in the preparation of bituminous mixtures for waterproofing cardboard, felt, joints and sleeves, can all be substituted by the aforesaid "optimal compound". This product by itself, therefore, does the job of all three of the components that are normally added to the required bituminous mixture, which represents a savings of both cost and time. The amount of "optimum compound" added to the distilled bitumen (of the type 180–200 or 80–100) can vary between 20 and 40%.

(C) Substitution of Atactic Polypropylene (PRA)

The aforesaid "Optimal compound" can advantageously substitute PRA in the preparation of sealers for dams or similar applications. The reason for this is that it is the only product that melts easily at 180°–190° C. while being mechanically agitated.

The results of the tests carried out on samples of bituminous conglomerate used for road surfacing, as described in the foregoing section "A", are given below by way of proof of the validity and novelty of this invention. The four parameters generally used for the evaluation of products of this type are shown, with the first column showing the results obtained in the tests and the second column showing the values for the products that have been normally used to date.

| Measured Parameter | Test Samples | Standard Values |
|---|---|---|
| Penetration Index | +5 | −0.8 to −0.9 |
| Marshall Stability | ca. 1500 kg | ca. 950–960 kg |
| Marshall Slip | ca 3.85 mm | ca. 3.60–3.65 mm |
| Marshall Rigidity | ca. 330 | ca. 264 |

The obtained penetration index of +5, which indicates the susceptibility of a bitumen to temperature, is exceptionally high and is of particular interest as regards the product concerning this invention.

There are great quantities of sludges now on the market that have been obtained from the old method of waste-oil reclaiming where the waste oil is first subjected to a sulfuric acid treatment and then neutralized using lime. In contrast to the sludges obtained using solvents, these sludges have a high inorganic content, which does not make them very suitable for making waterproofing compounds for cardboard, felt and the like, or for making sealing compounds for dams and similar applications.

On the other hand, as regards the road-surfacing application, this high inorganic content of the acidified and neutralized sludges makes them more suitable because the inert material contributes to the aggregates normally added to the conglomerate. The disadvantage of these abundantly available acidized and neutralized sludges is that they cannot be used for road surfacing in countries that are either very warm or very cold, because at these extreme temperatures, maximum strengths cannot be obtained.

Another disadvantage of these sludges regards the use of the compound. The high inorganic content inhibits the making of the ready-made "loaves" for use on the site, together with the hot aggregates for making the conglomerate. Consequently, another "optimal compound"—similar to the one obtained with the sludges treated with solvents—has to be made. Since the inorganic content of this "optimal compound" is high—which does not permit making the aforesaid "loaves" by melting the said compound into distilled bitumen of the type 180–200—it has to be powdered to a grain size measuring less than 1000 microns (usually about 500–800 $\mu$). In this powdered form, the "optimal compound" is ready for being mixed together with melted bitumen at high temperature, of the type 180–200, that is added to the aggregate. The amount of binder is still about 6%.

The compounds and different usages of these compounds that have been mentioned and described above have only been given as non-restrictive examples of the possibilities conforming to this invention as expressed in one of more of the following claims.

I claim:

1. Sludge-elastomer-hardening product composition, useful in road surfacing, waterproofing of materials, sealing of dams and other applications when said composition is mixed with bitumen in a proportion of 20 to 40% composition, the remainder bitumen, said composition, comprising 44–66% sludge obtained from waste-lubricating-oil reclamation, 28–17% elastomer selected from the group consisting of EPDM and EPM, and 25–17% hardening product selected from the group consisting of isotactic polypropylene and atactic polypropylene.

2. Method for preparing bituminous conglomerates, comprising mechanically mixing 44–66% sludge obtained from waste-lubricating-oil reclamation by means of selective solvents, heating, adding 28–17% powdered elastomer selected from the group consisting of EPDM and EPM, stirring to provide a homogeneous mixture, adding to said mixture 25–17% powdered isotactic or atactic polypropylene, stirring to provide a homogeneous mixture, shaping said mixture into small slabs, melting said slabs and mixing together with distilled 180–200 type bitumen in a proportion of 20 to 40% mixture, the remainder bitumen, thereby forming a final mixture, and shaping said final mixture into loaves.

3. The method according to claim 2, wherein said powdered polypropylene is powdered isotactic polypropylene.

4. The method according to claim 2, wherein said powdered polypropylene is powdered atactic polypropylene.

5. The method according to claim 2, wherein said heating is performed to a temperature between 180°–190° C.

6. The method according to claim 2, wherein said elastomers and said polypropylenes are powdered to 600–800$\mu$.

7. The method according to claim 2, further comprising for employment in road surfacing, mixing and melting said loaves with a hot road surfacing aggregate of a temperature from 160°–180° C. in a proportion of 6% loaves to 94% aggregate and feeding the mixture into a conglomerate mixing unit.

8. The method according to claim 7, wherein said road surfacing aggregate comprises sand, stone and fillers.

9. Method for preparing bituminous conglomerates, comprising mechanically mixing 44–66% sludge obtained from waste-lubricating-oil reclamation by means of a sulfuric acid treatment followed by neutralization, heating said sludge, adding 28–17% powdered elastomer selected from the group consisting of EPDM and EPM, stirring to provide a homogeneous mixture, adding to said mixture 25–17% powdered isotactic or atactic polypropylene, stirring to provide a homogeneous mixture, shaping said mixture into small slabs, powdering said slabs to a grain size less than 1000 microns, and mixing together with melted distilled 180–200 type bitumen in a proportion of 20 to 40% mixture, the remainder bitumen.

10. The method according to claim 9, wherein said powdered polypropylene is powdered isotactic polypropylene.

11. The method according to claim 9, wherein said powdered polypropylene is powdered atactic polypropylene.

12. The method according to claim 9, wherein said heating is performed to a temperature between 180°–190° C.

13. The method according to claim 9, wherein said elastomer and said polypropylene are powered to 600–800$\mu$.

14. The method according to claim 9, further comprising mixing said bituminous conglomerate with a hot road surfacing aggregate of a temperature from 160°–180° C. in a proportion of 6% conglomerate to 94% aggregate, and feeding the mixture into a conglomerate mixing unit.

15. The method according to claim 14, wherein said road surfacing aggregate comprises sand, stone and fillers.

* * * * *